United States Patent

[11] 3,559,562

[72] Inventors: Herbert E. Carlson
Fort Bragg, N.C.;
Rodrick E. Black, Willits, Calif.
[21] Appl. No.: 831,181
[22] Filed: June 6, 1969
[45] Patented: Feb. 2, 1971
[73] Assignee: Boise Cascade Corporation
Boise, Idaho
a corporation of Delaware

[54] SULFUR DIOXIDE-RELEASING DEVICE
15 Claims, 4 Drawing Figs.

[52] U.S. Cl. ................................................. 99/239,
99/154
[51] Int. Cl. .................................................. A23b 7/00
[50] Field of Search ....................................... 99/154,
269, 271, 239, 258, 240, 100

[56] References Cited
UNITED STATES PATENTS

| | | | |
|---|---|---|---|
| 3,409,444 | 11/1968 | Gentry | 99/171 |
| 1,575,148 | 3/1926 | Carbone | 99/269 |
| 2,929,761 | 3/1960 | Stevens | 99/154 |
| 3,346,398 | 10/1967 | Tundermann | 99/154 |
| 3,450,542 | 6/1969 | Badran | 99/154 |

Primary Examiner—Robert W. Jenkins
Attorney—Flehr, Hohbach, Test, Albritton & Herbert ABSTRACT: A device for preserving fresh fruit by releasing sulfur dioxide into a sealed container of the fruit. The device comprises a layer of solid coating material and a particulate compound forming a substantially uniform dispersion throughout the layer. The compound is characterized by the release of sulfur dioxide on contact with water vapor. One device is formed of a dispersion of sodium bisulfite in a layer of white scale paraffin wax containing a viscosity-increasing agent.

PATENTED FEB 2 1971  3,559,562

INVENTOR.
Herbert E. Carlson
BY Rodrick E. Black
Flehr, Hohbach, Test
Albritton & Herbert
Attorneys

SULFUR DIOXIDE-RELEASING DEVICE

BACKGROUND OF THE INVENTION

In one technique for storing fresh fruit, such as picked grapes, the fruit is packed in open wooden lugs or corrugated cases with vent holes and placed in a cold storage room. Sulfur dioxide gas is introduced into the room and permeates through the containers to the grapes in an attempt to prevent the growth of microorganisms, such as mold. The gas concentration must be closely regulated throughout the storage period. An excess of gas tends to injure the fruit, while an insufficient quantity permits mold to grow on the fruit. Moisture in the fruit vaporizes during storage since the containers are open. This dehydration leads to a loss of quality and appearance of the fruit. Another problem is that high concentration of the corrosive sulfur dioxide gas deteriorates equipment in the cold storage rooms.

In another storage technique, the fresh fruit at ambient temperatures is placed in moisture-tight boxes having a self-contained source of sulfur dioxide gas and the boxes are deposited in a cooling room. The moisture content of the fruit is retained in the container, tending to minimize dehydration deterioration of the fruit. To prevent the rapid growth of mold before the fruit has cooled completely, a relatively high concentration of sulfur dioxide gas must be emitted. The high concentration is necessary to prevent the fast growth of mold on the fruit which occurs at the warm, high humidity conditions prevalent in the essentially-sealed containers. When the fruit has reached the cold storage temperature, the quality of sulfur dioxide should be decreased to a steady, lower level for the duration of storage for two reasons: firstly, mold grows more slowly at this temperature, and, hence, less sulfur dioxide is necessary; secondly a high level of sulfur dioxide for prolonged periods of time will result in a deterioration of the fruit.

The technique of the preceding paragraph has been carried out by a method employing two different types of envelopes enclosing an agent, such as sodium bisulfite, that releases sulfur dioxide on contact with water vapor. The sodium bisulfite is in loose form. These envelopes are placed within the sealed containers. One type of envelope is readily permeable by moisture and, hence, rapidly releases sulfur dioxide. The second envelope, being less permeable by moisture, releases the sulfur dioxide more slowly than the first envelope. Since these two types of envelopes are required in each container, instructions must be given to the fruit packers and there is the possibility of the human error of omission of one or the other of the envelopes. In addition, the two different envelopes are costly to produce and the manufacture must be under close tolerances to emit predetermined amounts of sulfur dioxide. Furthermore, these envelopes release sulfur dioxide in a concentrated area of fruit adjacent to the envelopes. Hence, these fruits are subject to deterioration caused by exposure to an excessive concentration of sulfur dioxide gas.

SUMMARY OF THE INVENTION AND OBJECTS

This invention relates to a device for releasing sulfur dioxide under controlled conditions into a substantially sealed container of fresh fruit, such as grapes, to maintain the fruit in its freshly-picked condition over extended periods of time. The device comprises a coating of material on a sheet, such as paper, and a particulate compound essentially uniformly dispersed in the coating and characterized by the release of sulfur dioxide upon contact with water vapor.

The particulate compound is preferably sodium bisulfite or an acidic sodium sulfite mixture. The coating material is preferably a lacquer or a mixture of a major portion of scale wax and a minor portion of a compatible viscosity-increasing substance.

Sulfur dioxide is rapidly released on initial contact of the device with water vapor present in the container and to more slowly and steadily release sulfur dioxide for as long as 3 months or more.

In one embodiment of the invention, the device is coated on a paper sheet and inserted inside a fruit cushioning pad which, in turn, is positioned in a sealed fruit container. Alternatively, the coating may be formed on the internal surface of the cushioning pad. In a further alternative, with a corrugated case as the container, the device may form part of the container water vapor barrier. With wooden lugs as the containers, the device may be placed on a liner which may be used therein as a container seal.

Accordingly it is an object of the invention to provide an improved device for treating fresh fruit to preserve the fruit over extended periods of time, which device eliminates the deficiencies of the aforementioned fruit-treating methods.

It is another object of the invention to provide an improved device for releasing sulfur dioxide under controlled conditions into a substantially sealed container.

It is a further object of the invention to provide a single source of sulfur dioxide to be released under controlled conditions into a substantially sealed container of fresh fruit to thereby preserve the fruit over extended periods of time.

It is a further object of the invention to provide an economical, readily produced device that releases sulfur dioxide under controlled conditions without the requirement of close regulation in manufacture.

It is a further object of the invention to provide a device for releasing sulfur dioxide uniformly along the entire internal surface or surfaces of a sealed container rather than releasing in concentrated pockets thereof.

Other and further objects of the invention will be more apparent from the following description taken in conjunction with the drawing.

DETAILED DESCRIPTION OF THE PREFERRED EMBODIMENTS

Figure 1:
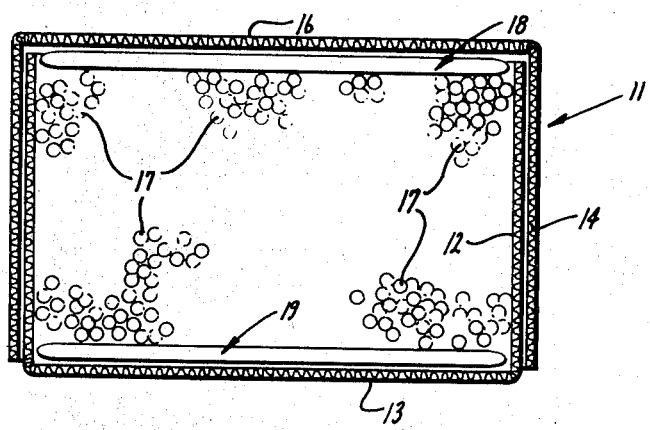
FIG. 1 is a cross-sectional view across a vertical plane through a fresh grape container according to this invention.

Referring to FIG. 1, the device of the invention may be placed within a container 11 having a lower portion 12 with a bottom 13 and an upper portion 14 with a top 16. The container is suitably of rectangular shape and fabricated of such material as fiberboard or a corrugated sheet and coated with a moisture vapor barrier. Portions 12 and 14 form a snug fit so that when the container is assembled, there is little leakage of air into, or moisture out of, the container.

According to the invention, grapes 17, or other fresh fruit, are stored within the sealed container 11. The container is provided with top and bottom cushioning pads 18 and 19, respectively. In one embodiment, the cushion has a liner 20, suitably formed on treated paper, folded over at the ends 21 and 22 to provide a cavity. A filling 23, suitably of a material such as redwood bark, excelsior, or shredded paper, is placed in the cavity. The filled pad provides resilience to afford shock resistance and to accommodate irregularities.

Figure 2:
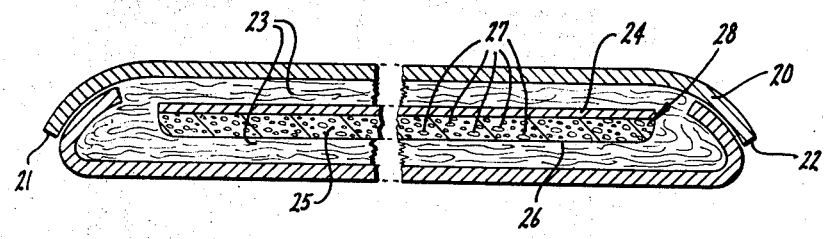
FIGS. 2 and 3 are enlarged cross-sectional views of cushioning pads according to this invention.

A particular embodiment of a cushioning pad is shown in FIG. 2. Placed within the pad is a sheet 24, of a material such as paper, coated with a solid layer 25 having an exposed surface 26. A substantially uniform dispersion of particles 27, which serve to release sulfur dioxide on contact thereof with moisture, is formed within the layer. Layer 25 dispersed with particles 27 and coated on a surface will be designated device 28 hereinafter. Layer 25 must be capable of coating sheet 24 in a viscous fluid state while retaining particles 27 uniformly dispersed therein. Furthermore, the coating must have the ability to harden without displacement of the uniform particulate dispersion.

In one device 28, a dispersion of a binder and solvent is mixed with particles 27 and coated upon the sheet 24. When the solvent evaporates, the particles remain in a uniform dispersion in the binder. Suitable binders are lacquers or resins such as: ethyl cellulose, cellulose acetate, cellulose acetate butyrate, and polyvinylidene halides.

In another device 18, layer 25 is suitably formed from a major portion of a wax and a minor portion of an agent to increase the wax viscosity. Suitable waxes are paraffin wax, such as scale wax, microcrystalline wax, and various synthetic and naturally occurring waxes. The agent is first dissolved in molten wax and the particles uniformly dispersed into the solution. The molten mixture is then coated on a sheet by suitable means such as spreading with a wire-wound rod to a weight sufficient to coat the desired amount of particles. Another suitable coating method would be performed in a standard curtain coater.

Suitable viscosity-increasing agents for the wax must be compatible with the wax in the concentrations used. For example, polymers such as polymono-olefins, ethylene vinyl acetate copolymers, butyl rubber, butadiene-styrene rubber, and ethylene vinyl acrylate copolymers and terpolymers may be used. A suitable ratio of wax to viscosity-increasing agent is from about 2 to 1 parts by weight to about 8 to 1 by weight.

Particles 27 may be formed of any compound which releases sulfur dioxide upon contact with water vapor. The compounds are suitably chosen from the group: sodium bisulfite, sodium sulfite-fumaric acid mixture, sodium sulfite-potassium bitartrate mixture, and combinations thereof. Other heat-stable acids and acid salts may also be used.

The size of the particles 27 has an important effect on the release rate of the sulfur dioxide in the layer 25. The release rate is proportional to the size of the particles. This is apparent since grinding the particles to a smaller size permits a greater amount of coating material to surround the particles which inhibits the release of sulfur dioxide. It has been found that a uniform release is obtained from particles of a size distribution as follows: about 25 to 40 percent of the particles passing through a 100 mesh screen, but not through a 200 screen; about 15 to 25 percent of the particles passing through a 200 mesh screen but not through a 325 mesh screen; and the remainder of the particles passing through a 325 mesh screen.

Another factor in the release rate of sulfur dioxide is the concentration of particles in the coating. Increasing the amount of particles in the coating leads to a correspondingly increased release rate since there is less coating material to inhibit the contact of the particles with moisture. For normal grape storage, a suitable ratio of particulate compound to coating material is from about 5 to 1 to about 1 to 5.

A further factor influencing the sulfur dioxide release rate and the length of time for release is the thickness of the coating. A thicker coating yields a slower and more prolonged release since the moisture takes a longer time to reach particles as they are further removed from the exposed surface. A suitable coating thickness has been found to be about 7 to 12 mils for release on the order of several weeks to several months.

Another factor in the rate of sulfur dioxide release is the permeability, of the material used as the particle coating, to water vapor. The more permeable the material, the faster is the sulfur dioxide release rate.

During storage, grapes at ambient temperatures are placed in a number of containers 11 and deposited in a cold storage room. When the water vapor permeates the cushion pad and reaches the particles 27 that are exposed on surface 26 of layer 25, a reaction takes place immediately releasing sulfur dioxide into the container in large quantities. This fast release of sulfur dioxide prevents a rapid growth of mold which normally occurs in splits, cuts and abrasions caused by the handling of the grapes before or during packaging under the high-temperature, high-humidity conditions prevalent in the containers. After the initial reaction of the exposed particles, a slower release is produced by the particles dispersed more deeply into the coating. Consequently, sulfur dioxide gas is slowly released over a long period of time, such as over three months, in sufficient quantities to inhibit the growth of mold while maintaining a level of sulfur dioxide sufficiently low to not injure the grapes.

Although there is no intention to be limited by any particular theoretical explanation for the prolonged, substantially steady release of sulfur dioxide, one possible explanation for this phenomenon could be a "channelling" effect. It is possible that various particles touch or come quite close to touching various other particles in layer 25 to form an almost continuous bridge of particles. As the particles are consumed by reaction with water vapor, a three-dimensional channelling, or honeycomb, effect is produced whereby particles positioned more deeply in the coating become successively available for reaction with the water vapor. Thus, at any time after the initial reaction of particles at the surface of the layer an approximately equal number of particles are exposed for reaction with the water vapor.

It is noted that sulfur dioxide is released along the entire surface of the device and, therefore, the cushioning pads. This results in a substantially uniform concentration of sulfur dioxide in any area of the grapes, thus avoiding the risk of deterioration of grapes caused by excessive sulfur dioxide exposure.

Figure 3:
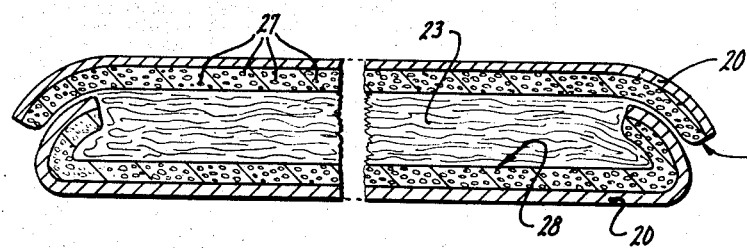

Referring to FIG. 3, in another cushioning pad, device 28 is coated directly on the internal surface of liner 20. This eliminates the necessity for the insertion of a secondary coated sheet into the cushion pad as in the embodiment of FIG. 2.

Figure 4:
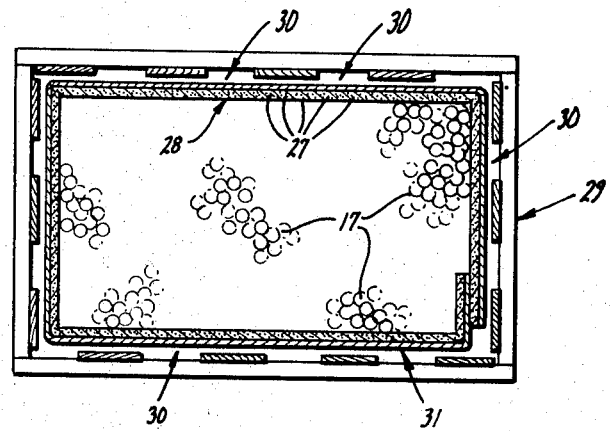
FIG. 4 is a wooden lug lined with a paper barrier incorporating this invention.

Referring to FIG. 4, wooden lug boxes 29 may be used instead of container 11 to store the fruit. These lug boxes normally contain perforations 30 for ventilation. Therefore, in order to form a moisture seal for the box, a liner 31 is placed on all internal surfaces of the box. According to the invention device 28 may be coated on liner 31 in a suitable manner as above described. Using the coated liner on all internal surfaces of the box, sulfur dioxide is released uniformly for from all directions to the grapes. This type of release is even a further safeguard than the cushions against a high concentration of sulfur dioxide to damage exposed grapes.

In another embodiment of the invention (not shown), cushioning pads 18 and 19 contain no sulfur dioxide releasing device. Device 28 is directly coated on the internal surfaces container 11 immediately adjacent to the grapes 17. The sulfur dioxide is released from all directions as in the preceeding paragraph.

The following examples serve to describe several specific embodiments of the invention.

EXAMPLE 1

A sulfur dioxide-releasing coating was prepared according to the invention. Elvax 260 a duPont trademark for an ethylene vinyl acetate copolymer (25.5 grams), was dissolved in 124.5 grams of molten scale wax (melting point of 128-—130° F.) at a temperature of 300° F. After cooling the solution to 200° F., ground sodium bisulfite was stirred into the solution to form a uniform particulate mixture. The mixture, maintained at 200° F., was coated on paper by means of a wire-wound rod until about 7 grams of sodium bisulfite was coated on an area equal to a cushioning pad main surface. This is a concentration of approximately 12 pounds of sodium bisulfite per 1,000 square feet of paper. After the coating was cooled to room temperature and solidified, it was placed as an insert into the cushioning pad.

Two of these cushioning pads containing 7 grams of sodium bisulfite each, were placed in a standard sealed corrugated box containing 26 pounds of fresh grapes at ambient temperatures. The boxes were placed in cold storage (at about 32° F.) for a period of about three months. When the boxes were opened, no substantial deterioration had occurred.

EXAMPLE 2

The same coating procedure and ingredients in the coating were used as in Example 1. The only change was the ratio of components. Sodium bisulfite (100 grams) was dispersed in a solution of 17 grams of Elvax 260 in 83 grams of scale wax (melting point 128—130° F.). Although the same concentration of 14 grams sodium bisulfite to 28 pounds of grapes was used, there was less wax coating on the sodium bisulfite particles resulting in a faster release of sulfur dioxide. After about four weeks of grape storage as in Example 1, the grapes would be in the same condition as when freshly picked.

EXAMPLE 3

The same procedure as in Example 1 was used with the following formula for the device: 68 grams of scale wax (128—130° F. melting point), 14 grams of Elvax 260, 62 grams of sodium sulfite, 56 grams fumaric acid. The fumaric acid and sodium sulfite react on contact with moisture to produce sulfur dioxide.

Grapes stored with the above coating in the concentration of 14 grams of sulfur dioxide-releasing agent per 28 pounds of grapes maintained the grapes in a fresh condition for over 1 month.

EXAMPLE 4

Following the procedure of Example 1, an equal weight of sodium bisulfite may be dispersed in a commercial cellulose acetate butyrate lacquer and coated on paper with the solvent being driven off by a low heat. This coated paper would be inserted into a cushioning pad as in Example 1 and should yield sufficient quantities of sulfur dioxide for at least 3 weeks.

It is apparent from the foregoing description that the amount of active sulfur dioxide-releasing agent used per pound of grapes to be stored may be suitably varied to accommodate changes in the amounts of storage time required. Also, the concentration of release agent in the coating can be modified to control the rate of sulfur dioxide gas released from the coating.

We claim:

1. A device for preserving fresh fruit by releasing sulfur dioxide under controlled conditions into a substantially sealed container of the fruit, said device comprising a layer of solid coating material and a particulate compound characterized by the release of sulfur dioxide upon contact with water vapor, said compound forming a substantially uniform dispersion throughout said layer, said device serving to quickly release sulfur dioxide on initial contact with water vapor and more slowly and steadily release sulfur dioxide thereafter for extended periods of time.

2. A device as in claim 1 wherein a mixture of said coating material includes a major portion of scale wax and a minor portion of a viscosity-increasing agent.

3. A device as in claim 2 wherein the binder is selected from the group consisting of polymono-olefins, ethylene vinyl acetate copolymers, butyl rubber, butadiene-styrene rubber, and ethylene acrylate copolymers and terpolymers.

4. A device as in claim 2 wherein the ratio of scale wax to agent is from about 2 to 1 to about eight to one parts by weight.

5. A device as in claim 1 wherein said coating material is a lacquer.

6. A device as in claim 5 wherein said lacquer is selected from the group consisting of ethyl cellulose, cellulose acetate, and cellulose acetate butyrate, and polyvinylidene halides.

7. A device as in claim 1 wherein said compound is selected from the group consisting of sodium bisulfite, sodium sulfite-fumaric acid mixture, sodium sulfite-potassium bitartrate mixture and combinations thereof.

8. A device as in claim 1 wherein the ratio of particulate compound to coating material is from about 5 to 1 to about 1 to 5 by weight.

9. A device as in claim 1 wherein the fruit is grapes and the extended time period is over 3 months.

10. A device as in claim 1 coated on a pliable base sheet which is inserted into a fruit cushioning pad.

11. A device as in claim 1 coated on the inside of a fruit cushioning pad.

12. A device as in claim 1 coated on the inside of the sealed container and forming at least a portion of the seal therefor.

13. A device as in claim 1 coated on a box liner used as a barrier to seal the container.

14. A device as in claim 1 wherein at least 30 percent of the particulate compound passes through a 325 mesh screen.

15. A device for releasing sulfur dioxide under controlled conditions into a substantially sealed container of fresh grapes, said device comprising a layer of solid coating material of about 7—12 mil thickness, formed of a mixture of a major portion of scale wax and a minor portion of a binder to increase the wax viscosity, finely ground sodium sulfite particles forming a substantially uniform dispersion throughout said layer, said device serving to quickly release sulfur dioxide on initial contact with water vapor and more slowly and steadily release sulfur dioxide for at least 2 months.